United States Patent [19]
Finvold et al.

[11] Patent Number: 5,313,850
[45] Date of Patent: May 24, 1994

[54] EARTH/GYRO POWER TRANSDUCER

[76] Inventors: Rodger C. Finvold, 4126 Quapaw Ave., San Diego, Calif. 921176; Paul E. Humphrey, 7665 Central Ave., Lemon Grove, Calif. 92045

[21] Appl. No.: 872,513

[22] Filed: Sep. 8, 1992

[51] Int. Cl.$^5$ .................... G01C 19/18; G01C 19/00
[52] U.S. Cl. ........................ 74/5.9; 74/5 R; 290/1 R
[58] Field of Search ............ 74/5.22, 5.2, 5.6 D, 74/5.9, 5 R, 5.34, 5.37, 64; 290/1 R; 322/4, 100

[56] References Cited

U.S. PATENT DOCUMENTS

| | | | |
|---|---|---|---|
| 2,677,194 | 5/1954 | Bishop | 74/5.9 X |
| 2,887,636 | 5/1959 | LaHue et al. | 74/5.6 D X |
| 2,968,956 | 1/1961 | Agins | 74/5.9 |
| 3,309,931 | 3/1967 | Adams et al. | 74/5.6 D |
| 3,739,480 | 6/1973 | Hanusek et al. | 74/5 R |
| 3,787,758 | 1/1974 | Ashby et al. | 74/5.6 D X |

Primary Examiner—Rodney H. Bonck
Attorney, Agent, or Firm—Ralph S. Branscomb

[57] ABSTRACT

This specification describes a completely new and different concept, method, mechanization, apparatus configuration and sequencing procedure for obtaining commercially useful energy and power, namely: the use of a gyroscope to generate output power from the earth's stored inertial rotational (flywheel) energy by fixing the housing of the gyroscope to the earth and using the rotation of the earth relative to the gyroscope's spatially stable rotor/gimbal assembly to rotate the input shaft(s) of a power transducer(s). This provides a power-output stroke over a near 180° precession excursion (near pole-to-pole alignment) until the rotor spin axis of the gyroscope is nearly aligned with the polar axis of the earth. Re-precession torques are then created on the inner gimbal within the gyroscope to re-orient the rotor spin axis vector direction by re-precessing the rotor spin by somewhat more than 180° to the near polar alignment direction required for the resumption of power output in a manner requiring essentially zero energy and power to provide relatively continuous, but intermittent, power output generation along with a multi-unit assembly for producing continuous uninterrupted power output.

An "Advanced Concept" based on rate gyro characteristics showing promise of enhanced performance is included.

27 Claims, 3 Drawing Sheets

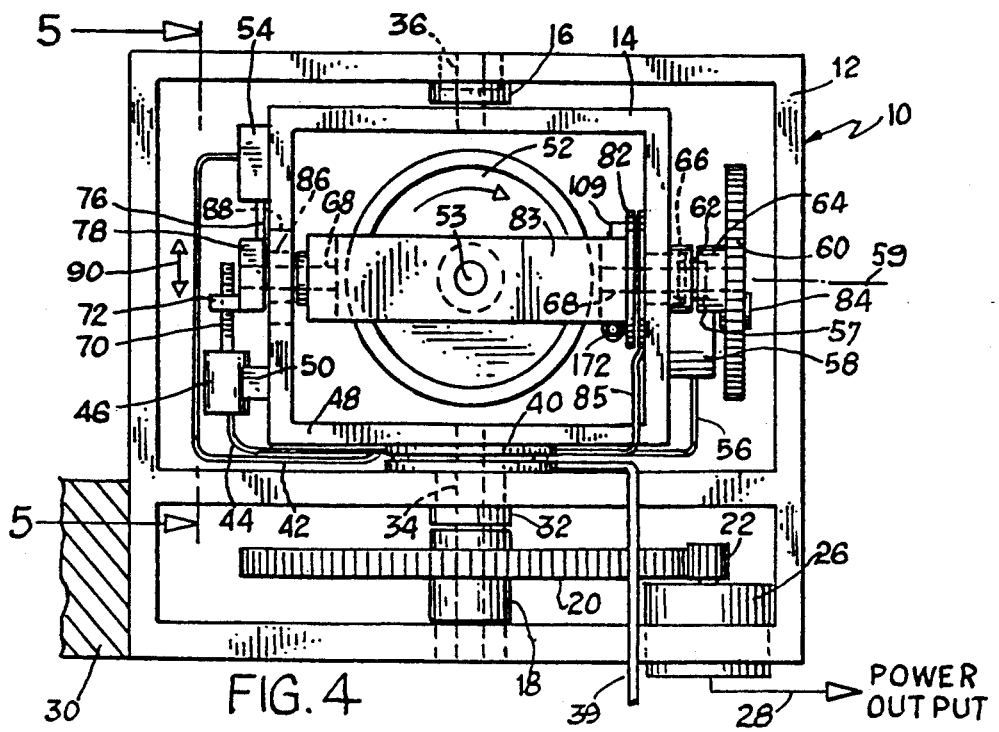
FIG. 4
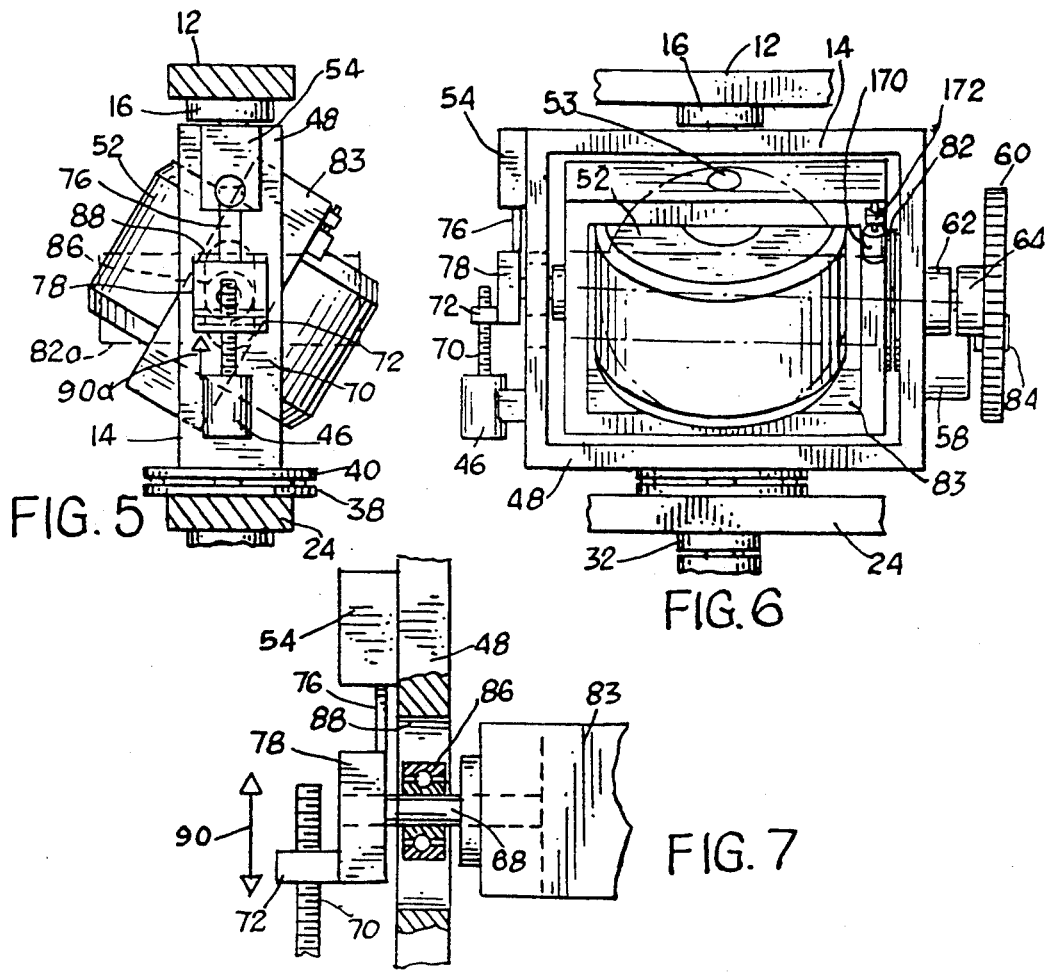
FIG. 5
FIG. 6
FIG. 7

EARTH/GYRO POWER TRANSDUCER

BACKGROUND OF THE INVENTION

The angular space-stability characteristic of gyroscopes relative to the earth's rotational movement is known. The use of precession of the spin axis of a gyroscope rotor, where the gyroscope housing is fixed relative to a host vehicle and the rotor/gimbal assembly is fixed to motionless angular space in order to generate navigational signals, is also well known.

However, it is not known how, without exerting a great amount of excitation (input) power, to effectively use a gyroscope in order to obtain significantly useful net output power via gyroscopic-rotor-precession-generated reaction torque from the earth's vast storehouse of rotational inertial energy on a continuous basis.

One reason for this is that the gyroscope rotor/gimbal assembly is stable (unmovable and unperturbable) when the rotor spin axis is in alignment with (parallel to) the earth's polar axis—a conceptual "catastrophe" when first encountered during preliminary concept analysis.

At this orientation of the rotor spin axis, the precession resulting from the application of precession torque of the rotor spin axis stops, and no further gyro reaction torque can be produced by the gyro rotor/gimbal assembly to oppose the earth's angular rotational velocity imposed torque as expressed by the gyro performance equation $T_p = K_p \Omega_p$. When the rotor precession rate $\Omega_p = 0$, $T_p = 0$.

Thus, there is no further access to the earth's stored rotational energy to generate useful output power—unless corrective measures are applied.

These corrective measures are the primary subject of this application for letters patent.

The conceptual theoretical solution to the "polar axis alignment catastrophe" would be to re-orient the rotor spin vector, somehow, back to the starting orientation of the power output precession "stroke",—hopefully, in a manner requiring a negligible amount of input or excitation energy compared to the energy extracted during the energy/power-output phase.

Some fairly obvious means exist for physically re-orientating the rotor spin vector direction of the gyroscope from the undesired stable polar axis alignment orientation to one wherein the spin vector direction of the rotor is such that it will again traverse a slightly less than 180° precession angular displacement toward the stable polar axis alignment orientation, during which angular excursion power may be extracted from the earth's rotational energy. Such obvious and simple re-orienting means generally require substantial energy expenditure. Thus, they are not practical from a power generation efficiency standpoint.

For example, this can be accomplished by simply reversing the direction of rotor spin. But the energy required to "brute force" reverse the rotor spin direction far exceeds the energy obtained during the intervening power output phase of the operational cycles. Even if the net energy output were positive, the time required for rotor de-re-spin is excessive, making the overall time-averaged power efficiency unattractive.

Re-precession torque applied around the torque power output (polar) axis by torque reversal, while properly re-orienting the rotor spin axis, is counterproductive in that, since the direction of the earth's rotation remains the same and the direction of the torque is reversed, the direction of energy flow is reversed. Thus, this procedure merely results in returning the energy to the earth's rotation that was extracted during the preceding power-output phase—plus a "tax" for the always attendant parasitic inefficiency factors.

So, to tap the physical rotational energy of the earth, a new, effective, and efficient method, apparatus, and mechanization is needed to produce useful power-output from the earth's vast storehouse of inertial rotational energy.

This need can be satisfied by employing the angular spatial stability and torque production characteristics of a precessing gyroscope rotor. By applying the torque production capability of a precessing gyro rotor as a deceleration torque on the earth's angular momentum, the earth's storehouse of rotational inertial energy may be accessed by interposing a power transducer between the motionless (in spatial coordinates) gyro outer-gimbal and the earthly inertial rotation.

To alter the earth's spatial parameters has been believed unattainable ever since Archimedes, 2500 years ago, requested ". . . a pole (lever) long enough and a platform . . . [in order to] move the earth." That platform and lever (torque) are now readily available, and have been, but unrecognized as such, for over a century. It's a gyroscope rotor/gimbal assembly.

The practical extraction of this readily available supply of enormous energy needs to be accomplished in a manner that does not require the expenditure of a large amount of excitation power, or include complex electrical or mechanical operations on the gyroscope and rotor, or that is otherwise impractical.

The basic elements of this invention were disclosed in Disclosure Document No. 220,425, filed Feb. 21, 1989, resulting from the first year of research on the concept.

This application for letters patent is based upon continuing R&D conducted over the ensuing elapsed time to "prove out" this new and different conceptual configuration of a gyroscope designed to extract power and energy from the inertial energy of a rotating planetrary body, such as the earth, consisting of the following events and milestones:

(1) The determination that theoretically there is an enormous quantity of pure unpolluting energy available from the energy contained in the rotational inertia of the earth—enough to supply all the energy and power requirements of the world's civilization, currently being met by oil production, for the next 100,000,000 years with only minimal and readily acceptable reduction in the daily rotation rate of the earth at the end of that period: approximately 30%, a 34 hour day—at the present rate of oil energy consumption.

(2) The determination that this supply of pure physical mechanical energy may theoretically be tapped by interposing the spatial angular stability of a gyro rotor/-gimbal assembly, plus a transducer to convert the gyro-/earth mechanical energy and power into the desired type for ready utilization, e.g., electrical, hydraulic, or other, between the onrushing inertial rotational energy of the earth and the referenced spatial stability—more accurately, rigidity (as in "brick wall" or Hoover Dam-)—of a gyro rotor and gimbal assembly.

(3) Theoretical analysis showing that by applying gyro precession reaction torque induced by the spatially rotating earth to a power transducer, or generator, shaft, the housing or framework of both gyro and generator being anchored to the earth, there is a direct correlation between: (a) the theoretically/mathematically determined reduction in rotational energy of the earth and (b) the amount of theoretically/mathematically determined earth-derived mechanical energy delivered to the input shaft of the power transducer (electrical power generator).

(4) Realization that re-precessional re-orientation performed by applying re-precession torque around the polar axis, while accomplishing the desired re-orientation of the spin vector, would be counterproductive. Since the applied torque would be opposite to that employed during the power output phase and the earth rotation direction remains the same, the direction of energy flow would be reversed. Thus the rotational energy of the earth would be increased at the expense of some other source of energy.

(5) Realization that by definition there is no rotation of the earth around an axis in, or parallel to, the earth's equatorial plane. Therefore, applying re-precession torque around an axis in, or parallel to, the earth's equatorial plane, theoretically would require only infinitesimal energy or power in comparison to that obtainable by means of polar axis precessional torque.

(6) Since there are three orthogonal axes in the gyro/earth coordinate system and torque around one axis creates precession around an axis normal to that axis, for any precession (motion) axis there are two precession torque axes that can cause precession around that same (motion) axis. Since the desired re-precession motion axis is in the equatorial plane, in order to re-precess or re-orient around the same equatorial axis as the power-output/polar-axis torque created precession motion, and the polar axis cannot be used for re-precession, the remaining, or third, axis lies in the equatorial plane normal to the desired re-precession action axis. Re-precession torque around this axis should theoretically require essentially no energy or power from the re-precession torque excitation source.

(7) Mathematical analysis of re-precession torque applied around an equatorial axis confirmed that the energy and power required to re-precess with torque around, or parallel to, an equatorial plane axis was indeed a theoretical, mathematical, and practical infinitesimal, many orders of magnitude below that obtained in the power output phase.

(8) Laboratory experimentation confirmed the validity of the theoretical/mathematical gyro/earth-rotational power output performance equations and that a high degree of correlation could be demonstrated between theory and practice.

SUMMARY OF THE INVENTION

A spinning object such as gyroscope rotor will not, in space, yield (move) directly (in-line) to torque normal to a spin vector component. Rather, the spinning rotor and thus the gyroscope rotor-supporting gimbal assembly will oppose such force (or torque) with reaction force (or torque). This will result in no motion around the torquing axis, only precessional motion around an axis normal to both the applied torque axis an a component of the spin axis vector that is orthogonal to both the applied precessional torque and the desired precession axis (which must be normal to the applied torque). This opposing force or torque can be, and often is, used to provide a stable spatial angular orientation reference distinct and separate from any rotation of the earth. There is no factor, term, or element in the gyro performance equations for "give" or spatial angular displacement of the applied torque axis due to applied precessional torque, and none has been physically observed.

However, in experiments with an AC transducer at rate table angular velocities near the earth's rate, a slightly lower frequency was observed at the beginning and end of the power-output phase. Since the precession torque is a sine function of the rotor spin vector orientation direction, this may be due to the "smallness" of the test-bed and resultant low torque combined with frictional non-productive torque elements that may represent a larger fraction of the gyro generated torque at the extremes of the precessional range. In this experiment, the electrical power production was only a small percentage of the mechanical power available, as determined from the precession rate.

When the axis of a spinning rotor is torqued around an axis normal to the spin vector, or a component thereof, in a given direction, such as by the torque required to power an electric power generator, then the gyro rotor spin vector precesses. This occurs, for example, when the gyroscope is mounted anywhere on the earth with the outer gimbal axis aligned with the earth's polar axis and a component of the rotor spin axis, as illustrated in FIG. 1, or spin vector component, is parallel to the equatorial plane. The gyro rotor and inner gimbal will experience a tilting torque around the axis normal to both the spin vector equatorial plane component and the externally applied polar-axis torque vector resulting in precession of the rotor axis around an axis in the equatorial plane normal to both "input" vectors. In gyro theory, if the axis of the applied torque is normal to the rotor spin vector, or a component thereof, the axis of precession movement (output motion) is normal to both "input" vectors.

This desired applied torque employs the rotational energy of the earth, as manifested by its rotational inertial mass/velocity coupled with the restraining reaction torque resulting from gyroscopic precession, to generate power from the relative angular motion of the earth and the angularly spatially stable spinning rotor and outer gimbal. This can be concerted into rotational mechanical power for generating electrical power output or other similar power, e.g., hydraulic, by an appropriate power transducer.

There are two fundamentally basic laws of the physical universe upon which this invention rests: (1) Conversation of Angular Momentum and (2) Conversation of Energy.

The basic principles on which this invention operates is the elementary definition of energy and power (either generated or expended), i.e., energy equals a force (or torque) multiplied by the distance through which that force (or torque) moves, $E = F \times d$ (or $E = T \times \theta$). Power equals force (or torque) multiplied by the velocity of the applied force (or torque), $P = F \times v$ (or $T \times \dot{\theta}$). The two factors in the equations for energy and power must be aligned, or have vectorial components that are aligned, with each other in order to produce or dissipate power. No matter how large one factor in the equations may be, if the other is zero or totally orthogonal to the other, no energy or power is produced, transduced, or dissipated, by both mathematical definition and experiential fact.

Another basic relationship employed throughout the materialization and mechanization of this invention is that the gyroscopic torque is directly proportional to rotor spin axis precession rate, $T_p = K_p \Omega_p$. Note that the precession motion axis is perpendicular to the applied torque axis. Therefore, these two factors taken together cannot produce or dissipate power. The action (displacement or velocity) aligned with the precession torque, required by the necessary motion to be combined with the precession-generated reaction torque to produce energy or power, must be derived from some other source. The torque axis (or vector component thereof) must be aligned with the rotational (motion) axis of vector component thereof) in order to produce (or dissipate) power.

In this invention, energy and power are derived from the inertial (stored) energy of the angular rotational mass velocity of the earth, the axis of which is coincident with the induced precessional reaction torque supplied by the gyro rotor precession. The motion of the earth is with respect to the unmoving angular space. This is coupled with the angular spatial stability (rigidity) characteristic of the rotor/gimbal structure of a free gyroscope which is "grounded" or "anchored" to angular inertial space. This results in an angular displacement, with respect to the spatial angular coordinates, of the earthly derived rotational momentum deceleration torque multiplied by the angular displacement of the imposed torque, or energy, $E_o = T_{E/p} \times \theta_E$. Power is derived from earthly rotational angular velocity when a gyro gimbal is interposed in the path of the earthly angular momentum, with consequent induced gyro rotor precessional reaction torque. The consequent reaction torque multiplied by the angular velocity of the earth provides the required input/output power, as determined from the equation defining power, $P_{i\text{-}/o} = T_p \times \theta_E$. By aligning the rotation axis of the gyro outer gimbal with the rotation axis of the earth and interposing a "soft" restraint between the spatially rotating earth and the spatially stable (rigid) outer gimbal of a gyro, the motion of the earth around the polar axis generates a reaction torque from the gyro outer gimbal by operating on a component of the rotor spin vector lying in the equatorial plane, to produce rotor precession and consequent causative precession reaction torque, output power is produced.

However, in the rotation of the earth relative to the space-stable angular orientation of an equatorial rotor spin vector component, the precessing torque eventually causes the rotor spin axis to rotate to an orientation wherein the spin axis is aligned with the polar axis of the earth. In this orientation, the rotor spin axis is coincident with the applied precession torque axis and there is no component of the spin vector in the equatorial plane. Thus, there is no component of the rotor spin axis normal to the polar or outer gimbal axis of the gyro, hence no precession reaction torque—the "polar axis alignment catastrophe."

This is the effect that held up the informal realization of the theoretical feasibility and the initiation of the development of the invention for a number of years.

The reaction torque at this orientation is only that due to the outer gimbal axis bearing friction, a minuscule and energy dissipative non-productive torque. Thus the gyroscope rotor no longer experiences precession or resultant precession reaction torque. Accordingly, no further output power can be generated because the rotor spin axis (vector) is in the direction of, and in alignment with, the axis of the rotation of the earth, leaving no component of the rotor spin vector in, or parallel to, the equatorial plane normal to the prior axis for the polar-axis rotational angular decelerative torque to act upon. The torque factor in the energy and power output equations has disappeared and is now zero.

Any deviation of the spin vector from polar axis alignment, thereby resulting in an equatorial axis component, is returned to zero by the applied earth rotational torque and the resultant precession reaction torque. As the rotor spin vector travels through polar axis alignment, the spin vector component in the equatorial plane changes direction; thus, the sign of the precession torque direction, and consequent precession direction changes direction also—always such as to effect polar axis re-alignment. This stable condition ceases power generation, and, since there is no component of the spin vector normal to the applied torque to cause any further precessional angular rotation, the rotor spin axis holds the orientation in alignment with the earth's polar axis.

The inventors recognize this "polar axis alignment catastrophe," having been frustrated by it for several years of analysis and experimentation. And they have provided a practical method and apparatus implementation for causing the rotor of the gyroscope to precess in a power stroke over an angular displacement slightly less than 180° (near pole-to-pole) of the rotor's spin axis. Then, using the absence of earthly rotation around an axis of the earth in an equatorial plane, a programmed sequence of re-precession forces and torques is applied to the gyroscope inner and outer gimbals to cause the associated rotor to re-precess back to the spin vector orientation required for the initiation of a succeeding power output stroke.

"Re-precess" and "re-precession" forces and torques are terms applied in the non-power-output phase of the operational cycle even though the direction of precession motion may be in the same rotational direction as during the power output phase. This is done to unequivocally differentiate this action from that which occurs during the power output phase. It is also a holdover from the initial experimentation days when it was believed necessary to reverse the direction of rotor spin or of precession during the non-power-output phase in order to re-orient the rotor spin vector back to the initial orientation both as to its direction of rotor spin in inertial space and its spin axis vector directional near alignment with the earth's polar axis, to start and experience the precessional torque from the rotational displacement and velocity of the earth in order to generate output energy and power in the succeeding power output stroke phase of the operational cycle.

To accomplish re-precessional rotational motion of the rotor axis and associated spin vector around an axis normal to the rotor spin axis vectorial direction, or component thereof, in the same rotational direction as during the preceding precession/power-output phase, a force or force-couple (torque) referenced to the outer gimbal, directed in the longitudinal plane containing the outer gimbal axis such that it cannot cause the unwanted precessional rotation around the outer gimbal axis, is applied to one or both ends of the gyro inner gimbal axis to produce a torque around an axis parallel to the earth's equatorial plane (vice parallel to the earth's polar axis as during the power output phase) in a direction to re-precess the spin axis of the rotor around an axis in the equatorial plane in the same plane and in the same rotational direction as the rotor axis precessed during the power output phase.

This is the preferred mechanization, recognizing that the desired end result could be obtained by de-re-spin of the rotor or by reversing the direction of precessional torque at the end of the power output stroke.

This torquing of the spin axis vectorial component precesses the rotor through alignment with the polar axis and continues the precession on toward alignment of the rotor axis with the equatorial plane. The torquing axis is now in the equatorial plane acting upon a polar component of rotor spin vector vice an equatorial component of the rotor spin vector, as in the power output phase.

As the spin vector traverses the equatorial plane, the polar component of the spin vector goes to zero. There is no longer any polar axis spin vector component upon which torque in the equatorial plane may operate—an "equatorial plane corollary" of the "polar axis alignment catastrophe."

Re-precession torque is interrupted just short of this condition. The generator portion of the power output transducing unit is then driven as a polar-axis torque-motor acting upon the spin vector component lying in the equatorial plane to move the spin axis of the rotor angularly across the applied equatorial-axis-torque dead zone wherein the spin axis of the rotor is in alignment with the equatorial plane of the earth, and thus, in alignment with the applied re-precession torque as well.

After the rotor spin vector traverses alignment with the equatorial plane, the direction of the rotor spin vector component along the polar axis has reversed and is opposite to that prior to the rotor spin vector traversing the equatorial plane. Thus, a torquing force in the opposite direction to that applied prior to the rotor spin vector approaching alignment with the equatorial plane is required to continue re-precession in the same direction, and is applied to the inner gimbal and rotor spin vector polar axis component, causing the rotor to experience further re-precession in the same direction as prior to the spin vector approaching alignment with the earth's equatorial plane.

This causes the rotor spin vector to again traverse the polar axis alignment and to return the orientation required for the start of an additional power output stroke.

Thus, a complete 360° continuous precession/re-precession of the spin axis of the rotor is accomplished, with the power output stroke being slightly less than 180 degrees of the rotor spin axis precessional angular displacement, generating output power derived from the earth's rotational energy during this phase of the operating cycle.

This power output is accomplished through the process of combining the reaction torque of a precessing gyro rotor with the rotational displacement and velocity of the earth by interposing a power transducing means between the two input factors that are required to produce output energy and power, namely; torque and either angular displacement or velocity. The transducer converts or transforms the pure mechanical power produced by the angular velocity and reaction torque into a more useful form such as electrical or hydraulic.

The installation and mechanization for accomplishing this consists of attaching the frame of a gyroscope in a fixed orientation on the earth with the outer gimbal axis parallel to the earth's polar axis, as illustrated in FIG. 1. The outer gimbal has a power gear, the axis of which is coincident with the rotational axis of the outer gimbal, as detailed in FIG. 4. The plane of the power gear is normal to the axis of rotation of the outer gimbal and drives a gear follower that, in turn, rotates an output power generating means such as an electrical power generator. Positioned within the outer gimbal is an inner gimbal with its axis of rotation normal to the axis of the outer gimbal. The inner gimbal, in turn, carries the spinning rotor of the gyroscope, the axis of which, in turn, is normal to that of the inner gimbal.

In this two-gimbal gyroscope, the spinning rotor is free to be oriented at any possible angle in a spatial three-axis coordinate system, even though the outer housing and outer gimbal axis orientation is fixed with respect to the earth.

The rotor spin vector remains fixed in the spatial angular coordinate system unless the rotor spin vector, or a component of the rotor spin vector, is acted upon by a torque. A torque imposed on the gyro gimbal system is transmitted by the gimbal system to a rotor spin vector component normal to the applied torque axis. The imposed torque causes precession rotation around an axis normal to the imposed torque. The corollary of this is that there will be no precession if there is no spin vector component normal to the torque axis (vector), which is the condition existing when the rotor spin vector is aligned with the applied torque vector.

The restraint of the follower gear in turning the transducer (generator) shaft, resulting from the differential motion between the rotating earth and the fixed-in-space orientation of the outer gimbal, creates a precessional reaction torque on the equatorial plane rotor spin vector component which is transmitted to the outer gimbal in the power stroke, the axis of which directly parallels the polar axis of the earth by design, construction, and installation. This power-generating reaction torque from the transducer creates a precession of the free spinning gyro rotor, which causes the rotor spin axis to precess from a near-polar axis orientation, around an equatorial axis, by means of rotor axial and associated spin vector rotation, to an alignment with the equatorial plane, and then on to a near alignment with the polar axis through an angular excursion slightly less than 180° relative to the earth's polar axis (approximately ±90° with respect to the earth's equatorial plane).

During this entire precession excursion, the torque created by the restrained earth's angular displacement and velocity is acting on the component of the rotor spin vector lying in the equatorial plane, as shown in FIG. 1. This is the power output stroke.

In this polar orientation of the rotor spin vector, the rotational motion of the rotor spin axis is aligned with the rotational motion axis of the earth, resulting in no component of rotor spin vector being normal to the polar axis and thus no precession torque being generated therebetween. The gyroscope and the spin axis of the rotor are in a stable condition and the desired precession torque becomes zero. This ends the power stroke.

As a primary component of this invention, the spin axis (vector) is now caused to be re-oriented in a manner requiring a minimum of excitation energy and power (with respect to that during the power output phase) back to an orientation required to develop precession torque and power output from the stored inertial rotational energy of the earth.

At the end of the power output stroke, as the rotor spin vector approaches alignment with the polar axis, torque is applied normal to inner gimbal axis, referenced to the outer gimbal of the gyroscope, in the plane of the outer gimbal and its axis which produces a torque normal to the polar axis rotor spin vector component. In the preferred mechanization, the direction of the applied torque is selected to cause a re-precession of the spin axis of the rotor in the same direction as the previous precessional motion of the spin axis of the rotor during the power output phase.

It may be understood that the invention would work equally well if the re-precession motion direction were reversed in order to return the spin vector to the orientation required for the beginning of the power stroke. However, uni-directional precession/re-precession appears far more preferable, especially at the higher precession/re-precession rates, the highest of which may only be achieved with a uni-directional precession/re-procession mechanization, thereby avoiding wasted time and energy along with the structural stress and strain of rapid directional reversal. This applied torque causes a re-orientation and the resultant desired re-alignment of the spin axis of the rotor through the natural phenomenon of gyroscopic precession. This method of rotor spin axis re-orientation requires essentially no power (theoretically), since the re-precession torque applied is around an axis in the earth's equatorial plane around which there is no rotation of the earth, by definition, and requires no substantial movement of the inner gimbal around the applied torque axis. This torque, the axis of which is in the equatorial plane, causes the rotor to precess for the rotational angular excursion of approximately 90° of the spin axis, or from about 175° from the negative polar axis to 265° from the negative polar axis to the orientation where the rotor spin axis is nearly aligned with the earth's equatorial plane.

The direction of the rotor precessional re-orientation is such that the applied torque and rotor spin axis are again nearly coincident, and essentially no precession results from an equatorial plane torque. Thus, the gyroscope rotor is again in a stable, unmovable orientation from the existent applied torque since there is no polar axis component of the rotor spin vector for an applied equatorial plane torque to act upon.

In this rotor spin orientation, excitation is applied to the input-power/output-power transducer to be operated as a torque-motor. This in turn drives the power output generating gear to be operated in a direction that torques the outer gimbal around its axis in the reverse direction to that existing during the power-output phase to continue the re-precession in the same rotational sense and direction as during the power-output phase, since the equatorial plane spin vector orientation is now in the reverse direction to that existent during the power output phase. This results in precessing the inner gimbal and rotor spin axis through, e.g., about 10 degrees of the total 360° degree rotor axial precessional/re-precessional rotational movement.

Excursion during this phase should be reduced to an absolute minimum, since energy is required from the torquing excitation because the torque axis is now coincident with, or aligned with, the earth's rotational axis. Thus, the condition for the production or transfer of power is satisfied. The invention is now transfering or "pumping" power into, and thus "re-storing" the earth's rotational angular momentum and associated energy from the power supply network, thereby reducing the net power output per cycle and thus reducing the overall "practical" efficiency even though very little energy is "lost."

Equatorial axis re-precession force, and resultant equatorial axis re-precession torque, is then re-applied normal to the inner gimbal axis, but now in a direction opposite to that applied during the rotor spin axis angular movement from 175 degrees to 265 degrees from the negative polar axis. This causes the rotor spin axis to further precess or tilt through the orientation where the spin axis of the rotor is again parallel to the polar axis of the earth, and with the direction of rotation of the rotor being such that the rotor is again in the orientation for the start of the subsequent power output stroke. This re-precession torque can move the spin vector from near equatorial plane alignment through polar axis alignment.

The "polar axis alignment catastrophe," is avoided because now the applied equatorial axis torque is operating on the polar component of the spin vector which doesn't change direction on traversing the polar-axis alignment.

This thereby completes the entire 360° cycle of power output and precessional/re-precessional rotation of the rotor spin axis vector.

It is therefore an object of this invention to provide a new and improved means for producing and supplying energy and power on a continuous, but intermitent, basis. The stated procedure accomplishes this objective through the use of an inherently angularly space-stable gyroscopic reference element, the gyroscope's outer gimbal. This procedure utilizes the rotational energy of the earth to generate useful power output in a manner that is commercially feasible, practical, aesthetically acceptable, produces zero environmental pollution.—
—And all the component parts are basically completely recyclable.

If completely continuous power is a requirement, this can be accomplished by employing three or more units with overlapping and programmed sequential power output phases.

Another object of this invention is to provide a new and improved method and apparatus for generating power from a space-stable gyro, utilizing the precession of the spinning rotor axis through a nearly 180° power stroke to a nearly stable polar-axis alignment condition and then applying a programmed sequence of re-precession torques to the rotor spin axis in directions appropriately aligned with respect to the precession torque previously applied to the rotor spin axis, to cause the rotor spin axis and associated spin vector to re-precess back to the preceding power-output phase starting orientation.

Another object of this invention is to provide a power transducer, or transformer, to transform what has been believed to be an unavailable form, the earth's "unavailable" rotational mechanical physical energy, to usable physical rotational mechanical energy output and, in turn, to a more useful energy form such as electrical or hydraulic energy and power.

Another object of this invention is to provide a transmission means, without affecting, influencing, or changing the historical and future projected rotational rate of the earth. This objective may be accomplished by placing a unit assembly, constructed in accordance with the teachings incorporated herein, at a location where energy and power is plentiful but the need is slight, e.g., hydropower in Greenland or oil in the mideast or Alaska and driving this invention in reverse to increase the rotation rate of the earth. The earth could then serve as a "transmission line"60 for the added earth rotational energy to the point of need, e.g., the USA. To avoid an instantaneous, or even an infinitesimal, variation in the earth's rate of rotation, by establishing a communication link between the source and the sink, the input power could be matched to the output power to any degree of precision desired, thus providing the transport of energy over distances and/or terrain that is impossible, impractical, or undesirable at a cost that may well be comparable to, or lower than, conventional physical transport—without the attendant risk of disastrous environmental pollution and without affecting or changing the earth's rate of rotation. Thus, by matching the input power to the output power, no net change in the earth'rotation results. Non-polluting energy and power are delivered to the load without having to rely on the conventional means of "physical" transportation, with the attendant risk of accidental pollution, along with the delay and cost of physical transport and the cost of inventoried stockpiles.

In contrast, and in essence, the major functional difference between this invention and conventional means of power production that employ the chemical or physical energy of coal, oil, gas or nuclear is that this invention accomplishes the entire conversion process in situ rather than via physical transport from energy source to power sink.

Other objects and advantages of this invention will become apparent by reading the detailed description and examining the drawings, infra.

THEORETICAL SUPPORT OF OPERATIONAL PERFORMANCE

In precessing the rotor angular momentum vector form the southerly direction to the northerly direction, the angular momentum associated with the north/south axis has been changed by twice the angular momentum magnitude of the rotor. The unit vector component aligned with the north/south axis has changed from $-1$ to $+1$, a net change of 2, as in the case of linear momentum upon a change in direction while maintaining the same magnitude of momentum.

The similarity to linear momentum may be appreciated from the following relationships:

$$F = \frac{dM}{dt} = \frac{d(mv)}{dt} = \frac{mdv}{dt}$$

and, $$T = \frac{dH}{dt} = \frac{d(I\Omega)}{dt} = \frac{Id\Omega}{dt}.$$

From this, it may be appreciated that $$\Delta\omega_r(T_p/I_r)\Delta t$$

and, $$\Delta\Omega_E = (T_p/I_E)\Delta t$$

Also, since the same torque-time product, $T_p \Delta t$ is applied to the rotor precession and earth rotation.

$$T_p \Delta t = I_r \Delta\Omega_r = I_E \Delta\Omega_E$$

Since the earth doesn't change its spin vector orientation and the gyro rotor doesn't change its spin vector magnitude, this equation must be interpreted as the earth changing its spin vector magnitude and the gyro rotor changing its spin vector orientation, or changing the magnitude of the rotor spin vector component magnitude along the outer-gimbal axis.

Thus, we see, since torque, angular momentum, and spin rate are all vectors, the angular momentum of the earth may be increased or decreased over an interval of time by the appropriate selection of the sign or direction of the applied torque, thereby concurrently either increasing or decreasing the rotational energy of the earth.

Next, it is appropriate to address the question of how a gyroscope may be mechanized, configured and utilized to produce the desired torque.

We know that the precession rate of a gyroscope rotor is proportional to the applied torque, $\Omega_p = K_p T_p$, and that output energy is equal to the product of this torque multiplied by the angular excursion through which that torque moves, $E_o = T_p \theta_T$, while power is equal to the applied torque multiplied by the rate of angular displacement of the applied torque, $P_o = T_p \dot{\theta}_T$.

By interposing a "soft" restraint between the spatially rigid outer gimbal of a gyroscope and the rotating earth, consisting of a power transducer with the housing anchored to the rotating earth and the shaft geared to the spatially rigid outer gimbal, the torque created by a load on the generator will slow the earth's rate of rotation and reduce the rotational energy of the earth. It can be mathematically shown that the reduction in energy and power of the earth due to this gyro/earth-produced action/reaction torque is identical to the power delivered to the input shaft of the transducer and consequently to the output load power imposed on the transducer output.

Thus, since this latter statement is linearly true over any interval of time, the inventors have demonstrated a method of extracting pure unpolluted and unpolluting energy and power from the vast storehouse of the rotational energy of the earth and transforming that raw mechanical power into a form for conventional transmission to the consumer and load or sink.

This energy supply is so enormous that it can provide all of the energy currently being obtained from oil, at the present rate of consumption, for the next 100,000,000 years and result in slowing the earth's rate of rotation by only 30% at the end of 100,000 millennia. It might be noted in passing that the enormity of the earth's stored energy is due, in large part, to the same fifth power of the radius that makes the gyro so effective as a transducer or transformer of energy and power as the rotor radius increases, infra.

Now, it might be argued that what the earth giveth during precession, the earth taketh away during re-precession. While this is true if the re-precession torque is applied around the polar axis as in the "transmission line" configuration, supra, it is not true when constructed and operated in accordance with the teachings of this application for letters patent. By applying the re-precession torque around an axis in the equatorial plane, essentially no energy (theoretically) is required to re-precess the gyro rotor back to the starting orientation, in comparison to the amount of energy extracted from the earth's rotation during the precession/power-output phase resulting from polar-axis torque.

Analysis shows that it is the earthly polar angular displacement, $\Delta\theta_E$, in concert with, or multiplied by, the applied torque, that results in the energy transfer, $\Delta\theta_E = T_P \Delta\theta_E$. If there were no earthly polar-axis rotation, there would be no existent energy to extract. Since there is no pre-existing rotation of the earth, $\dot{\theta}_E = 0$, around any equatorial axis, by definition, there can be no significant energy transfer either into or out of the earth's rotation by applying a re-precession torque around an equatorial axis. The only energy transferred to or from an equatorial axis of the earth is that due to the incremental velocity squared term, $(\Delta\theta_E)^2$ in the binomial expansion of the incremental energy contribution expression, $I(\theta_E \pm \Delta\theta_E)^2/2$, a mathematical infinitesimal which can be ignored with no significant error in the resultant theoretical/practical performance determination when $\dot{\theta}_E = 0$.

Another argument might be that, during re-precession, angular momentum is first transferred by the rotor from the north polar axis to an equatorial axis and then from the equatorial axis to the south polar axis in a negative direction to that transferred during precession, thus negating the incremental change in angular rotation rate, and consequent energy change, of the earth.

Again, not so. Angular momentum around a specified axis can only be changed by means of a torque around the axis in question. During re-precession, there is no torque around the polar axis, except during a brief period to nudge the spin axis through the equatorial plane "dead zone." Since this is employed for only a small fraction of the tim and the earthly excursion angular displacement over which the opposite torque was applied during precession and power output, this reduces the output energy by only a small fraction of the output energy obtained during precession.

Probably the most significant result of all of the theoretical/analytical investigations was the determination that, all other parameters in the determination of the energy and power available from the operational invention remaining constant, impractical at large radii, but a highly instructive restriction at the lower and intermediate radii, the energy and power theoretically available—and producible—is proportional to the fifth power of the rotor radius.

The justification for this startling claim, in essence, is the following:

$E_o = T_p \theta_E$ $P_o = T_p \dot{\theta}_E$ $T_o = T_p$ $T_p = H_r \Omega_p$ $H_r = I_r \Omega_r$ $T_p = I_r \Omega_r \Omega_p$ $I_r = m_r (r_r)^2$.

If all three characteristic dimensions of a rotor (radius, rim width, and rim thickness) are scaled uniformly by some constant and the rim width and thickness are expressed as a ratio of, or factor times, the radius, then, $m_r = K_r(r_r)^3$.

Thus, we have the following:

$I_r = K_r(r_r)^3(r_r)^2$ $\phantom{I_r} = K_r(r_r)^5$ $T_o = K_r(r_r)^5 \omega_r \Omega_p$ $E_o = K_r(r_r)^5 \omega_r \Omega_p \theta_E$ $P_o = K_r(r_r)^5 \omega_r \Omega_p \dot{\theta}_E$.

The meaning is simple: Within the range wherein all parameters may be, and are, held constant, except rotor radius, every time the radius is doubled, the output energy and power capability is increased by a factor of 32. Another way of looking at its is that, if the radius is increased by some small percentage factor, the output is increased by five times that percentage factor. For example, if $\Delta r_r = 10\%$, $\Delta P_o > 50\%$. Even when the disruptive and destructive aspect of centrifugal/centripetal force becomes a concern, wherein the "bursting force" integrated over the rotor diameter is proportional to $r^2 \omega^2 = (r\omega)^2$, the damage of the increased disruptive force, resulting from an increase in radius with the rotor rotation rate held constant, may be alleviated by trading off an increased in $r_r$ with a corresponding decrease in $\omega_r$ dropping the radius effectiveness to the fourth power.

This results in the increase in energy and power production capabilities for each doubling of radius being only a factor of 16 instead of 32 provided that the precession rate remains the same for the two conditions.

While, as conceded earlier, "holding all other variables constant," is an unrealistic restriction over the complete range of possible rotor radii, it is applicable, with present day material technology, up into the range of 5–10 times the 1" rotor radius employed in the experimental test-bed.

Furthermore, by tying an increase in rotor precession rate, $\Omega_p$, to the same factor applied to the rotor radius, or the power output becomes a sixth power of the rotor radius, or 64 times the power output capability, for each doubling of the rotor radius. This appears theoretically possible up to about $\frac{1}{3}$ the rotor rotation rate. And there is a long way to go before the $\Omega_p$ of 1–2 rads/s employed in the test-bad experiments approaches the experimental $\omega_r$ test-bed values of rotor speeds of $\omega_r \approx 1500$ rads/s, over which range the power output is a linear relationship with respect to precession rate.

These "discoveries" of the fourth, fifth, and sixth mathematical exponential power effects on the theoretical energy and power output potential capabilities lends considerable credence to the commercial success and utility of the concept.

For example, while there is considerable room for improvement in performance over that achieved with the experimental test-bed within the present day limitations of materials science technology, an increase in the strength of materials in the range of 10–100% allows a theoretical corresponding increase in energy and power output of 50–6400% under appropriate applicable conditions, assuptions and restrictions.

Similarly, "tricks" such as employed in the design of gas turbine rotors wherein the rim is pre-compressed, thereby allowing considerable elongation of the circumferential pre-compressed state before "normal" stress-induced elongation of the un-pre-compressed state sets in, allows a considerable increase in rotor rotation rate and/or rotor radius before stress failure occurs.

There seems little chance that this technique could apply to improving the strength of the inner gimbal frame, unless constructed as a ring—a possibility. Without allowing a precession rate increase comparable to the rotor rotation rate increase, the performance increase is limited to the fifth power of the increase in the rotor radius within the stated tensile strength limitations.

However, improvement in the strength of material that allows a corresponding increase in the precession rate, would, without increasing the size of the assembly, theoretically allow an increase in power output as a linear function of the strength of material increase factor since both rotor rotation rate and precession rate could be increased only in proportion to the square root of the increased tensile strength. Applying the allowable increase factor to $r_r$ only with appropriate trade-offs to reduce $\omega_r$ would allow an increase in power output proportional to the fourth power of the radius ratio—and by equality, also to the fourth power of the corresponding strength of material increased factor.

BRIEF DESCRIPTION OF THE DRAWINGS

A more complete understanding of the mechanization, workings, and methodology of this invention may be gained by reading a description of the mechanics of its operation and by examining the drawings.

FIG. 4 is a side elevation view of the gyro assembly;

FIG. 5 is a sectional view taken on line 5—5 of FIG. 4 detailing the re-precession torquer installation;

FIG. 6 is a view similar to a portion of FIG. 4, illustrating the application of force between the outer gimbal frame and the inner gimbal axis as a result of initiation of re-precession by the re-precession torque-motor;

FIG. 7 is an enlargement of a portion of FIG. 4, partially cut away to illustrate the re-precession torquing and spin axis torque application mechanism, along with the inner gimbal axis orthogonality deviation sensor;

DETAILED DESCRIPTION OF THE PREFERRED EMBODIMENTS

Figure 1:
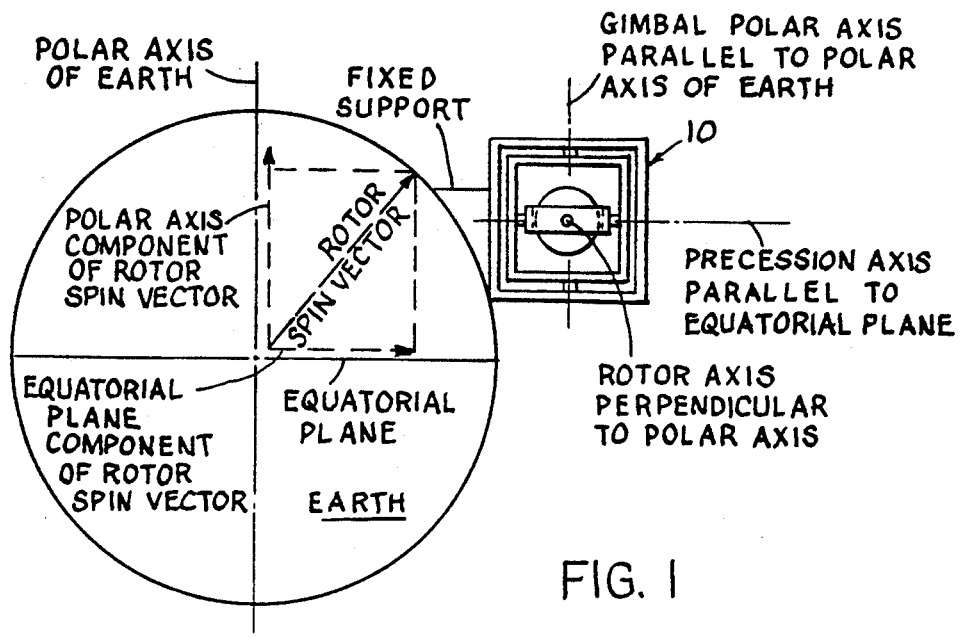
FIG. 1 is a diagram showing the relationship of the gyroscope/earth/rotor/gimbal rotational axes, the installation of the power-transducing/electrical-generation/power-output producing element(s), the gyroscope-rotor/gimbal/transducer assembly and its relationship with the earth.

Referring now to the drawings, gyroscope 10 has an outer housing 12 fixed to the earth, the outer gimbal bearings in which are aligned with (parallel to) the earth's polar axis. The gyroscope has two gimbals oriented so that the spin axis of the rotor adjusts to the conditions of the earth's rotationally applied load torque and imposed re-precession torques. The earth rotates about its polar axis (see FIGS. 1, 2 and 4) from West to East along the equatorial plane. The gyroscope housing, along with the outer gimbal bearings 10, is rotated in motionless space along with the earth, with the spin axis of the rotor and the gimbals in a space-stable orientation, unless and until disturbed by a precession or re-precession torque. Even then, in the "normal" operation, the outer gimbal's angular orientation remains fixed in angular space unless the alternate power take-off, infra, is employed. Only the inner gimbal and associated rotor spin axis undergo angular displacement as a result of induced or applied torques. Rotational orientation of the outer gimbal is of no consequence, and the system works equally well regardless of any such specific orientation.

Rotor 52 is driven in rotation by an appropriate power source (excitation), which power ultimately would be derived from a fraction of the power-output of the invention, and is mounted in respective gimbals 83 and 14 so that the rotor spin axis is free to move around an equatorial axis orthogonal to the rotor spin vector component in the equatorial plane, and around the polar axis with respect to both space- and earth-referenced coordinates. However, the gyroscopic characteristics that form the fundamental basis for this invention restrict the rotation of the spin axis around the polar axis of the earth to essentially zero with respect to inertial space-referenced coordinates under all operational conditions, except when the alternative power take-off option is being used. But, since the earth is rotating with respect to inertial space, the rotor is free to move, and, in fact, is required to rotate around the polar axis with respect to the earth in response to the earth's angular displacement or the angular velocity of the spatially rotating earth.

The rotational displacement and angular velocity of the earth with respect to the angular spatial stability (even rigidity) of a free gyroscope rotor and gimbal assembly provides one of the two essential elements of this invention for the production of power. The other is the torque generation capability of a rotating and precessing gyro rotor. But these characteristics have been well known for decades. Any attempt to make use of them for power production would soon run into three more characteristics: (1) limited duration of power output before encountering (2) "gimbal lock," wherein the axis of the rotor becomes aligned with the torque axis and refuses to precess an further with the previously directed torque along with (3) extreme difficulty in efficiently re-orienting the rotor for another "power stroke."

All of these difficulties have been solved within this invention to produce continuous, but intermittent, power output without fuel or daily attention over long periods of time—theoretically, eons. Even the intermittency may be corrected, as in steam and IC engines, by combining three or more unitary assemblies having sequentially phased and overlapping power output strokes, or with electrical or inertial energy storage during power strokes along with energy and power conversion and withdrawal during re-precession periods.

The problem of exact phase matching involved with direct introduction of AC power into an existing power grid may be solved by incorporating a gear differential. This art is well known by its incorporation in virtually every automobile drive train, in which the input/output rotational velocity relationship between two shafts may be modified with the introduction of an incremental positive or negative rotational velocity around a third axle or shaft.

In this invention the basic, conventional free gyroscope is operated in the normal manner, having an element demonstrating spatial angular stability. The unperturbed rotor rotational axis, along with its associated spin vector, remains aligned in the same direction with respect to inertial space unless acted upon by a precessional force-couple, or torque. The earth-referenced coordinates are not a part of the stable or motionless inertial space but rotate within it.

The gyroscope rotor being an angularly space-stable element and the gyroscope case or frame being secured to the earth, the rotor equatorial plane spin vector component senses the angular displacement of the gyro housing with respect to such space-stable reference coordinate system and thus senses the polar axis rotational angular displacement and velocity of the earth. The inner gimbal is free to rotate about an axis parallel to the equatorial plane of the earth. Thus the angularly space stable gyroscope rotor and gimbal assembly rotates with respect to the earth about the polar axis of the earth at the earth's rate in motionless spatial inertial coordinates. This causes the outer and inner gimbal assembly to rotate relative to the stable earth connection as an entity.

By connecting drive gear 20 to axle 34 of the outer gimbal, gear 20 rotates against earth-referenced transducer drive gear 22, which turns a mechanical-to-electrical power transducer rotor, such as an electrical power generator shaft, for generating electrical power that passes out through line 28 (see FIG. 4). This will be described in more detail hereinafter.

While the earth and attached gyro housing are rotating relative to the space-stable gyroscope's rotor/inner-gimbal assembly, the gyroscope's outer gimbal is turning on its axis relative to a coordinate system referenced to the earth at the earth's historically, and pre-historically, constant rate of rotation, independent of, and regardless of the magnitude of, the applied load. There is no factor in the gyro performance equations for a modification of the earth's constant rate of rotation by an conceivable gyro-imposed load, other than a virtually insignificant $\Delta\theta_E$ as limited by the enormous mass and moment of inertia of the earth, $\Delta\theta_E \approx 0.3\ \theta_E$ after 100,000,000 years, the total existing rotational energy of the earth also being the beneficiary of the fifth power of the radius previously applied to the gyro performance effectiveness, supra. When restrained, as by a loaded power generator shaft, this applied load produces a precessional reaction torque on the equatorial plane spin vector component that allows the earth's rotational inertially stored energy to be accessed and converted into rotational mechanical kinetic energy and power applied to the power transducer input shaft as previously described.

When the gyro rotor spin axis is not aligned to the outer-gimbal/earth-polar axis and a torque is applied to the gyro's outer-gimbal (polar) axis, there is a tilting effect (precession) on the rotor spin axis about the equatorial plane axis that is normal to both the earth's polar axis and the rotor spin vector component lying in the earth's equatorial plane. The polar axis space-referenced rotation of the earth, when caused to act upon (torque) a rotor spin axis vector component directed in the equatorial plane, causes the rotor and associated inner gimbal to precess about an axis in the equatorial plane normal to the rotor equatorial spin vector component. As the rotor spin axis and inner gimbal traverse the angular displacement (precess) between the earth's poles, about an equatorial plane axis, they rotate about the polar axis with respect to the earth because the rotor axis component in the equatorial plane is stable (fixed) in angular inertial space and the earth is rotating with respect to inertial space. In general, whereas the earth's space-referenced rotation rate causes the rotor's equatorial spin vector component to rotate around the earth-referenced polar axis, the induced precession torque, developed as a reaction to the earth's space-referenced rotationally applied torque, causes the gyroscope rotor spin axis to tilt (precess) with respect to the earth's polar axis and equatorial plane.

Because of the rotor spin vector component along the earth's equatorial plane and because torque is applied to the outer gimbal of the gyroscope by the mechanization of this invention due to the relative rotational movement between the earth and the gyroscope outer gimbal, a twisting force-couple or torque is induced on the equatorial component of the spin axis vector of the rotor, which causes precession of the rotor spin axis about the equatorial plane axis orthogonal to the equatorial component of the rotor spin vector.

The rotor spin vector component that is effective in producing precession is that component normal to both: (1) the precession torque applied to the input/output (polar) axis and (2) the equatorial precession action (motion) axis. The resultant precession motion causes the rotor spin axis to precess into an alignment with the polar axis of the earth and coincident outer gimbal axis of the gyro.

Figure 9:
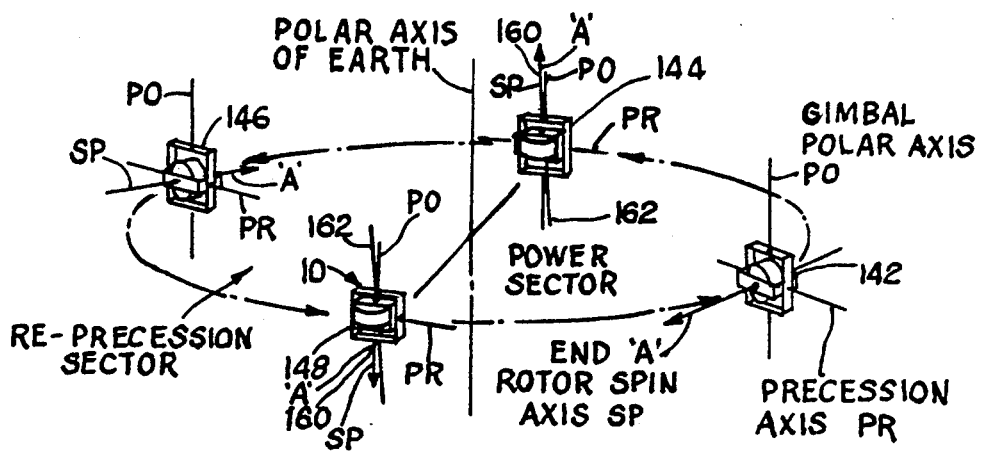
FIG. 9 is a diagrammatic illustration of the rotor spin vector angular orientation as a function of power-input/output precession induced torque and applied rotor re-orientation re-precession torques.

Accordingly, it may be observed in reference to FIG. 9 that relative to the spinning rotor in gyroscope 10 at point 148, the outer gimbal axis PO is always in alignment with the polar axis of the earth and the inner gimbal's rotor bearing axis, being aligned with the spin axis of the rotor, is also nearly aligned with the polar axis. Thus the lower end 160 is pointing towards the south and the upper end 162 is pointing to the north, or the oppositely directed polar axis.

Actually, the gyroscope outer gimbal illustrated in FIG. 9 maintains its fixed spatial orientation, and the earth rotates relative to the gyroscope's rotor/gimbal assembly. However, for this explanatory description, the gyro is changing its position relative to inertial space an exaggerated distance. In actuality, the earth would only rotate a very small fraction of a degree during one complete operational precession/re-precession cycle.

For point of reference (see FIGS. 2 and 9) location 148 is at somewhat less than −90°, (arithmetically, somewhat more positive) with respect to the positive equatorial plane, or the start of the power stroke. The spin vector is a few degrees removed from the polar axis in order to assure an equatorial component of the rotor spin vector and precession in the proper direction. At location 142, or 0°' the spin axis of the rotor has precessed such that the spin axis is in alignment with the equatorial plane. At location 144 or +85° (with respect to the equatorial plane), the spin axis of the rotor is again nearly aligned with the polar axis, with end 160 now pointing to the north. At this orientation, which is the end of the power output stroke, the direction of the rotor spin vector is such that the inner gimbal is in a nearly stable orientation.

By applying a re-precession torque on the rotor spin axis, as will be described in more detail hereinafter, the rotor spin axis continues to precess in the same direction, so that at position 146 (see FIG. 9) the spin axis is again nearly parallel to the equatorial plane. The spin axis is nudged through this equatorial plane neutral, or "dead" zone, and the spin axis continues to precess, to complete the 360° rotational precession of the inner gimbal and rotor. When the gyroscope gimbal/rotor assembly 10 is back into the condition at 148, the rotor spin axis is again aligned for another approximately 170° precessional power output stroke.

Referring now to FIG. 4, gyroscope 10 has an outer housing 12 that is secured to the earth 30. Positioned in the housing 12 is an outer gimbal 14 supported by bearings 16 and 32 that in turn supports an inner gimbal 83 on bearings 66 and 86 that supports a spinning rotor 52 on shaft and bearings 53.

Rotor 52 is driven by a known means that is not shown. The rotor can be rotated in any suitable, known manner, the direction of rotation of which is immaterial, determining only the specific direction of precession resulting from any specified direction of applied precession torque. Inner gimbal frame 83 is in turn rotatable, supported by shaft 68 in bearing supports on outer gimbal 14. The outer gimbal 14 is positioned for rotational movement on shafts 34 and 36 in suitable bearings 16 and 32. Retainer sleeves 16 and 32 form bushings for spacing outer gimbal 14 with the end wall of housing 12, and to position the main power gear 20 on shaft 34. Main power gear 20 is keyed to shaft or axle 34 and rotates with shaft 34. Pinion gear 22 interconnects with the gear 20 to rotate transducer 26 in a manner previously described.

(As an aside that might prove helpful in understanding the "alternative power take-off" concept along with the "Advanced Concept," infra, it might be noted that the "alternative power takeoff" acts in a manner similar to the spring in a rate gyro. All three have one thing in common, namely; the transfer of torque from one orthogonal axis to another. The torque to deflect a torsion or spiral spring in a rate gyro does not come from anything existent on the output, or spring, axis; but, rather, it comes from the angular rate around the input axis and the associated torque to deflect the spring on the output (precession) axis. Thus, a "rate gyro configuration" may be used to transfer useful torque from one orthogonal axis to another. In the rate gyro, the torque developed around the output axis allows a meter to be placed on the spring deflection in order to measure the rate applied to the input axis. One way of looking at the configuration is that the input axis is "precessing in space" at the host vehicles rate due to the spring torque applied to the output axis.

(Similarly, the "alternate power take-off" configuration works by substituting a "frictional" or "energy disipative" torque load on the output axis for the non-disipative "spring" which provides a more convenient and usable axial rotational velocity for the power transducer shaft.

(Also , similarly, the "Advanced Concept" configuration, infra, basically works by going all the way to a "rate gyro configuration" by placing a torsion or spiral spring on the concept invention's normal equatorial precession axis. By interposing a power transducer shaft between the rotating earth and the space stable outer gimbal, power may be generated by combining the torque transferred, by gyroscopic action, from the equatorial (former) "precession" axis spring deflection to the polar power output axis in combination with the earth's rotation rate and consequeent earth inertial deceleration torque imposed on the power transducer shaft.)

Referring to FIG. 4, mounted on the end of inner gimbal shaft 68 is a bearing 66 and a power output gear 60 that is secured to sleeve 64 that is keyed to shaft 68 so that the gear rotates with shaft 68. A driven gear 84 is driven by the precession axis (alternate) power output gear 60, with rotor gear 84 driving a generator armature or rotor 58. The output of transducer 58 is connected by electric lines 56 to slip rings 40, with the power output being fed through line 39 to the appropriate external electrical circuits.

Figure 8:
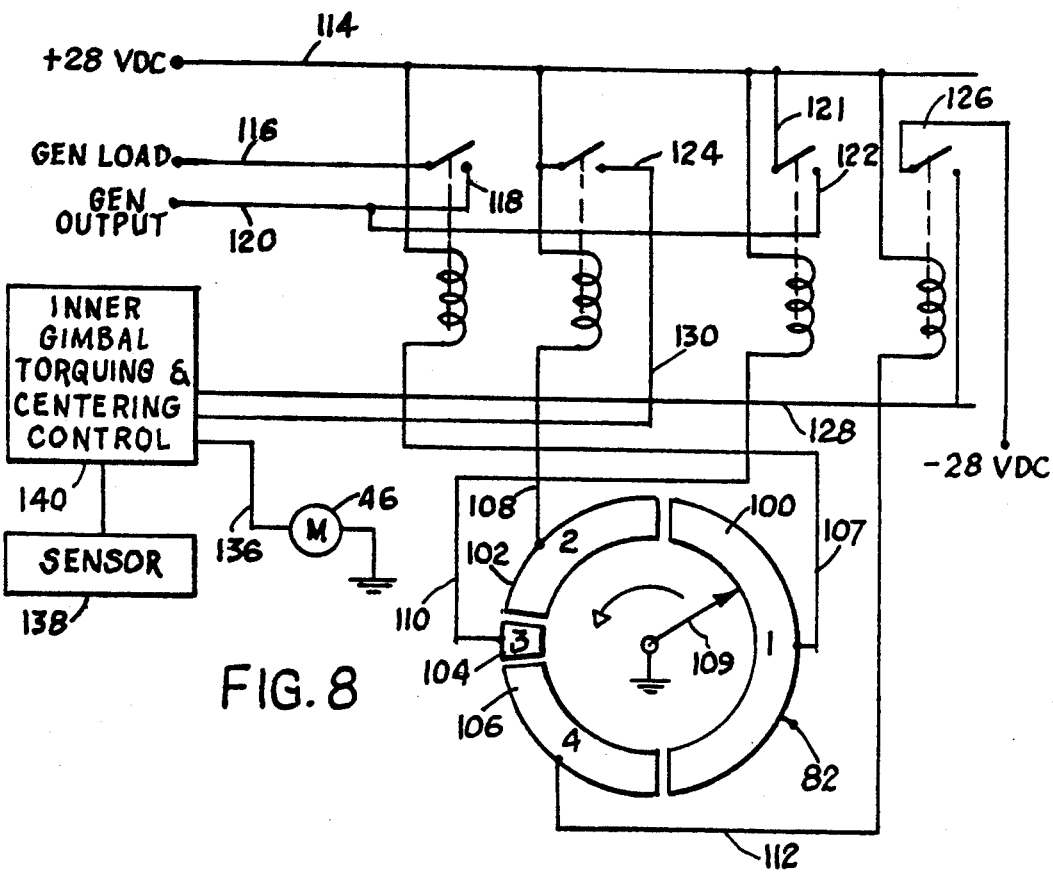
FIG. 8 is a basic wiring diagram of the gyro/earth power-output, precession/re-precession control circuitry.

Mounted on the inside of outer gimbal frame 14 is a sector-switch device 82 that corresponds with the multiple sector-switch 82 (see FIG. 8). Rotating contactor 109 is secured to, operates from, and provides an electrical signal representative of shaft 68 angular orientation to make contact with switch segments 100, 102, 104, and 106 that comprise ring sector switch 82 mounted on the wall of outer gimbal 14. Electrical connections pass through multiple wires 85 to the appropriate slip rings on slip ring assembly 40 to the external conductor wires 39.

At the other side of inner gimbal 83, (see FIGS. 4, 5, 6 and 8) the end of shaft 68 passes through bearing 86. Bearing 86 is fitted into vertical slot 88 (See FIGS. 4 and 5) which allows end movement in outer gimbal frame 14 of the end of inner gimbal shaft or axle 68. Connected to the outer end of shaft 68 by a suitable busing or bearing is plate 78 that has a side member or ear plate 72 that is threaded to receive screw 70 that is powered by jack screw motor 46, that is in turn secured to the side of outer gimbal frame 14 by attachment 50. Jack screw motor 46 drives screw member 70 in a rotating movement, which in turn, through the threaded connection, applies a force to ear 72 and connected plate 78 in the direction of arrows 90. The jack screw is capable of exerting force on the end of shaft 68 in either direction in slot 88, upon appropriate control voltage or current supplied to jack screw torque motor 46 by the Inner Gimbal Torquing And Centering Control 140.

A position or displacement sensor 54 is connected to finger 76 that in combination provides an electrical signal representative of the deviation from orthogonality of axle 68 of inner gimbal 83 fully realizing that a multi-turn rotary potentiometer on the motor shaft would provide greater resolution and accuracy. The other end of axle 68 is positioned in spherical bearing 66 to allow pivoting movement of shaft 68 in slot 88. Electrical positioning error control signals pass through lines 42 from sensor 54 and, as modified by external circuitry, back through lines 44 to the jack screw motor 46 from a power source and control circuit that is interfaced through slip rings 40 and wires 39. This mechanization reduces any error in the orthogonality of the inner and outer gimbal axes, the presence of which tends to produce precession about an unwanted axis.

It should be realized that the application of "single ended torque" is employed for ease of visualization and as an example. It should not be considered as "restrictive." A mechanization involving supporting the inner gimbal on a large ring gear and pinion drive would apply a more conventional "torque." However, while the gear and pinion "shafts" experience a conventnional torsion torque, the gear and pinion each experience a "single ended" torque—at the point of gear and pinion tooth contact.

It may be observed that rotor 52 rotates on its spin axis 53 with inner gimbal 83 allowing various magnitudes of the spin vector components to be resolved along the polar axis and the equatorial plane. It is these spin vector components acted upon by precession and re-precession torques as programmed that produce the precessional, re-precessional and power input/output performance. This provides freedom of the spin axis to be precessed in any desired angular direction upon application of the appropriate torque to the inherently (unperturbed) space-stable rotor axis 53 (in the absence of applied or induced precessional torques), whether applied intentionally or unintentionally. Outer gimbal 14 permits free rotational movement about its axis, the ends of which are 34 and 36, which axis is installed and mounted such that it is normal the earth's equatorial plane.

Referring now to FIG. 8, the circuit control sector-switch 82 (FIG. 4) consists of a plurality of circularly oriented connector segments 100, 102, 104, and 106 that are contacted by a movable switch contact 109 that, for illustrative purposes, is connected to ground. (An ungrounded return line could be employed and might be advantageous under certain circumstances.) Each of the conductor segmented switches are associated with respective coils of solenoid controlled switches 118, 124, 122, and 126.

When contact 109 contacts conductor 1 or 100, then electrical current passes through line 114 and through the solenoid winding of switch 118 and to ground through the sector-switch contactor 109. This powers up the solenoid and closes electrical contact 118, which closes conductor line 120 to 116. Conductor 116 is in a circuit that connects the transducer/generator output 28, such as a group of transducers 26 to output load 116. In this mode, power is generated through line 28 from the transducer(s) 26 and/or 58. Also, the transducer load(s) and the drive gear(s) 20 and/or 60 exert an earth-reference torque on outer gimbal 14 and inner gimbal 83 in reaction to the applied earth rotational space-referenced precessional torque, due to the spatially rotating earth. This, in turn, exerts torque on the appropriate equatorial plane spin vector component of rotor 52 through axles 53 in inner gimbal 83.

During this period of operation, jack screw motor 46 is specifically energized through line 136 to centering control 140. Centering control 140 comprises a circuit that energizes jack screw motor whenever an off-center condition is detected by deviation sensor 54—except during re-precessional action by this re-precession torque motor. Sensor 54 senses the deviation from orthogonality of shaft 68, which deviation information is provided through a comparator in centering control circuit 40. The centering control functions to control jack screw motor 46 to cause bearing 86 to be correctly positioning of the inner gimbal axis 68 to alignment with the equatorial plane of the earth.

The axis of the spinning gyro rotor 52 is inherently angularly space-stable and through its bearing connections, is freely positionable angularly in space by appropriate precession torques. Outer gimbal 14, with the application of torque around the polar axis, does not change its rotational axial angular orientation in space with the rotational torque of the power output of the earth, but rather maintains its spatial angular directional orientation in the spatially fixed coordinates in the equatorial plane as determined by the rotor spin vector component direction in the equatorial plane. Accordingly, in inertial space coordinates, the earth rotates around gear 20 and, conversely, in earth-based coordinates, gear 20 makes one rotation with respect to the earth for each rotation of the earth.

While the spin axis of rotor 52 may precess in a polar (longitudinal) plane about an axis in an equatorial plane orthogonal to the equatorial plane spin vector component in response to a polar axis precession torque, this does not rotate the outer gimbal axis in a polar plane, being constrained by shafts 36 and associated bearings in the housing which, in turn, is firmly attached to the earth. Nor does the outer gimbal rotate about the space-referenced polar axis; such precessional rotation would only be produced by torque around an appropriate equatorial axis, which is not present in the "normal" or basic mode.

However, an "alternative" power transducer placed on the previously designated precession action axis 68, which lies in the equatorial plane, will, due to the equatorial axial torque created by this transducer load, produce precessional rotation about an axis normal to both: (1) the induced load torque vector component and (2) the mutually orthogonal spin vector component, both in the equatorial plane. The precession (action) axis is the axis that is normal to both (1) and (2): the polar axis or the axis of the outer gimbal. This is of little consequence to the basic functioning of the invention, since the outer gimbal carries the inner gimbal with its orthogonal axis with it. Thus, orthogonality of the outer gimbal axis with the inner gimbal axis, which remains in the equatorial plane, and the rotor spin vector component in the equatorial plane is maintained—even in the presence of outer gimbal rotation around the polar axis. All spin vector components in the equatorial plane are by definition normal to the polar axis. Thus, the outer gimbal's angular rotational orientation or re-orientation about the earth's polar axis, due to a precessional torque imposed on the inner gimbal precessional axis 68 resulting from a load applied to transducer 58, has no effect on the basic operational performance of the assembly.

During the "normal" power stroke previously described (load torque applied to the outer gimbal axis only), the precession previously described causes the spin axis, and associated spin vector, of rotor 52 to rotate in the plane of the earth's polar axis, or longitudinal plane, through an alignment with the equatorial plane and continuing on to an inverted alignment with the polar axis. At this orientation, the direction of rotation of rotor 52 is such that precession torque no longer causes the spin axis or spin axis vector to move out of alignment with the polar axis. Accordingly, no further power is generated on gear 20, because there is no precessional torque on the spin axis due to its alignment with the axis of rotation of the earth and the resultant lack of any component of rotor spin normal to the polar axis for the polar axis torque to act upon.

It is then necessary to move or rotate the spin axis and associated spin vector direction of rotor 52 from the near-polar axis alignment. This is accomplished by rotating sector-switch connector 109 that contacts the conductor switch plate 2 or 102 at a rotor axis displacement of about +85 degrees from the positive equatorial plane. This connection energizes the solenoid of switch 124, closing switch 124 and feeding power through line 130 to Inner Gimbal Torquing And Centering Control 140. At the same time, the centering control is disconnected and the power line to solenoid switch 118 is opened, removing the generator load from generator 5 drive pinion gear 22 to power gear 20, thus removing the torque load from shaft 36 and outer gimbal 14.

Figure 3:
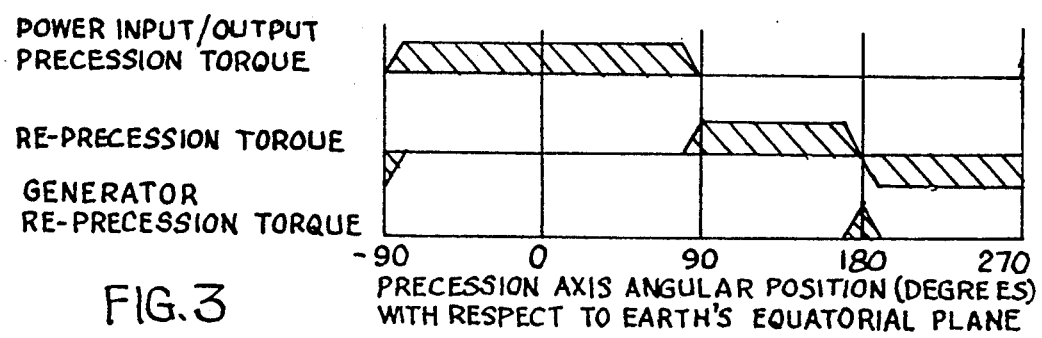
FIG. 3 is a graph of the load-induced torque and applied precession torques relative to rotor spin axis vectorial induced precession orientation angles of the gyro rotor spin vector as programmed by the control circuitry and as dictated by the angular position of the sector-switch contacting element.

Note that in the three-dimensional representation of space coordinates, a precessional torque around either one of two of the three orthogonal coordinates can, and will, cause precession around the same third orthogonal coordinate. By properly selecting the direction of the applied precessional or re-precessional torque, the resultant precessional direction for the applied re-precessional torque around the third axis can be made to be in the same direction and additive. Thus, by sloping or tapering the applied and/or induced precessional torques, as indicated in FIG. 3, a relatively uniform precession/re-precession torque and consequent precession and re-precession rate may be achieved, thereby avoiding the undesired shocks implied with sudden start/stop operation attendant on step-function changes.

The inner gimbal torquing and centering control 140 senses a signal in line 130 and in response energizes jack motor 46 through line 136. This drives jack screw 70 to put inner gimbal torquing force on lead screw nut 72, that is in turn impressed on the end of inner gimbal axle 68. This provides a torquing force on inner gimbal 83 around an axis in the equatorial plane normal to the polar axis and thus creates precession by action upon the polar axis component of the rotor spin vector. The spin axis is subjected to a precession torque from the jack screw. This re-precession torque is designed to cause rotor axis re-precessional rotation in the same direction as the precessional rotation direction during the power output stroke, and accordingly causes the spin axis to rotate as illustrated in FIG. 9 to the position of about 175 degrees from the positive equatorial plane reference (see FIG. 2). The torque generated by the jack screw precesses the rotor spin axis around an axis normal to both the polar spin axis vector component of rotor 52 (FIGS. 1, 2, and 4) and the applied (jack screw) equatorial plane torque axis. This causes precession of the rotor spin axis vector around inner gimbal axis shaft 68. At about 175 degrees from the positive equatorial plane reference, the re-precession torque becomes neutralized by the spin axis being aligned with jack screw torquing axis lying in the equatorial plane and resultant loss of polar axis rotor spin vector component on which to operate.

Jack screw torquing is then discontinued and an electrical connection made through contact 109 contacting conductor 3 or 104, through line 110 and through the solenoid of switch 122, closing switch 122. This closes motor drive circuit 121 that supplies power to one or more of the motor/generator(s) 26, that powers generator 26 to operate as a polar-axis torque-motor, operating on the equatorial plane rotor spin vector component to precess the gyro rotor through the equatorial plane "dead zone" caused by the coincident alignment of the jack-screw torquing axis and the rotor spin axis. This applied polar axis torque causes the spin axis of rotor 52 to be rotated a small amount, through this jack screw re-precessional neutral position, after which operation of the polar-axis output power generator as a polar-axis torque-motor is discontinued.

It should be noted that while the generator is operating as a torquer, the system is "pumping" energy back into the rotation of the earth. This does not affect the efficiency, theoretically, if assumed to be performed in a "lossless" manner: no energy is being lost or dissipated—theoretically. It is merely being "re-stored" back into the earth's storehouse of rotational inertial energy—to be "re-cycled" in the succeeding power output stroke. However, it does reduce the net power output per operational cycle and thus reduces the "practical" efficiency. It is desirable to reduce the duration of this portion of the operational cycle to an absolute minimum for "nudging" the rotor spin vector through the "dead zone." Ten degrees is assumed for illustrative purposes. One degree is believed to be an achievable goal, which if achieved would improve the overall time-averaged practical power output efficiency by about 5% (9°/180°), for illustrative purposes.

An electrical connection is then made with switch conductor 4 or 106. This provides power through the solenoid of switch 126, closing switch 126. This switch provides a negative DC current with respect to that just previously applied to the jack motor as a re-precessional torque-motor, which then passes through line 128 to the centering control, which in turn provides a negative drive to the jack motor 46 that causes motor 46 to rotate the jack screw 70 in the reverse direction, exerting a torquing force through ear 72 in the opposite direction to the re-precession torque just previously exerted by the jack screw against shaft 68. Since the rotor spin vector component along the polar axis has reversed direction and "two negatives make a positive," rotor 52 then experiences re-precession forces which cause the spin axis vector to rotate in the same direction through the remaining angular excursion form −175 to −85 degrees with respect to the positive earth's equatorial reference plane, which, in turn, returns the spin axis vector of rotor 52 to the orientation condition required for initiation and a repetition of the power stroke.

In this manner, inner gimbal 83 rotates with the spin axis of the rotor 52 and associated spin vector (see FIG. 1) in a manner illustrated in FIGS. 4, 5, 6, and 9 through the complete 360° angular excursion necessary for energy and power extraction from the earth's storehouse of mass/velocity energy as well as rotor axis and associated spin vector re-orientation.

To avoid unwanted gyroscopic drift, the center of mass of the rotor/inner-gimbal assembly must be at the intersection of the gimbal axes. Any deviation from this specification coincidence allows gravity to induce a precessional torque, resulting in an unwanted positive or negative contribution to energy and power output from gravitational/mass-displacement energy having a very limited magnitude contribution to, but a detrimental effect on, overall performance.

Normally, in gyro design, the rotor is centered and static balancing weights are added to the inner and/or outer gimbals to perfect the balancing. This procedure is far from perfect but would be included for initial pre-operational balancing of the assembly.

Because this equipment is intended to operate for long periods of time, dynamic, real-time, remotely controlled motorized balancing weight(s) 172 are required with electrical control leads routed through slip rings on the inner and outer gimbal axes to an external controller.

Since the theoretical precessional torque is some constant multiplied by the rotor precessional rate, $T_{pt} = K_p \Omega_{p'}$ and the theoretical output mechanical power is precession torque multiplied by the earth's constant rotational rate, $P_{omt}=T_{pt}\times\theta_E$, and the actual electrical power output is the output voltage multiplied by output current, $P_{oeA}=E_o\times I_o$, and $T_{Pa}=P_{oea}/\theta_e$. Thus, knowing the actual power output, along with the precession rate, and after correcting for inefficiencies, the contribution to the precession torque due to gravity acting on the mass unbalance, as determined from the deviation error equation, $\Delta T_o=T_{Pa}-T_{pt}$, can be determined. From this determination an error correcting signal may be derived to drive motorized balancing weight(s) 172 by a suitable motor(s) 170.

The precession rate may be derived from a tachometer substituted for, or in conjunction with, the alternate power output generator 58; the earth rate is well known and stable. Thus the theoretical power output is easily determined. The difference between the theoretical and the actual power output provides for basis for deriving the mass unbalance and the consequent error-correcting signal.

Because of the enormous mismatch between gyro-/earth capabilities and electrical power generator requirements with respect to shaft torque and velocity in the polar axis power take-off mode, an alternate method has been shown. With a polar axis rate of $\frac{1}{4}°$/min or 70 $\mu$rads/s, it can easily be appreciated that significant power output would require and produce an enormous torque around the polar axis of the gyro, since, in the power output equation, torque is reciprocally related to shaft rotation rate: the smaller the rate, the larger the torque.

However, the "normal" precession action axis has the capability of high angular rotational velocity and low torque, thus more closely matching the requirements of electrical power generators.

Figure 2:
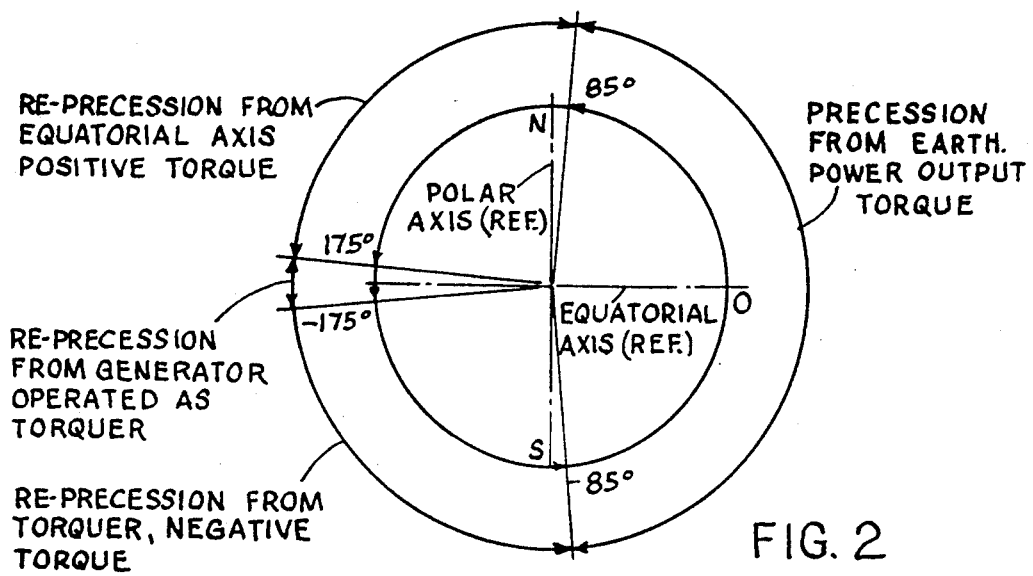
FIG. 2 is an angular relationship diagram of the gyro-rotor precession, power input/output and re-precession angular excursion/duration and sequential relationships.

Therefore, for those applications where polar axis coupling to the power output generator's input shaft torque and/or angular velocity requirements are unattractive from a torque/velocity mismatch standpoint, the alternate (equatorial axis) power take-off on the precession axis as shown in FIG. 1, items 60, 84, 58, and 56 may be (1) substituted for, or (2) partially combined with, the "normal" power takeoff.

In the "normal" mechanization, as previously described, the "precession-torque" axis and "precession-action" axes are mutually symmetrical with respect to the equatorial plane mutually orthogonal spin vector component.

Thus, torque applied around the previously designated "precession-axis" will create "precession action" around the previously designated "precession torque" axis. Therefore, alternate generator 58 may be operated as a torque motor acting upon the same mutually orthogonal equatorial plane spin vector component as the power output transducer, in a manner to substitute for the torque formerly created by gyroscopic precessional change in rotor spin vector components of angular momentum, in opposition such that any change in equality of opposition magnitude would create a compensating change in rotor spin vector angular momentum.

The precession rate may be controlled to zero by means of servo feedback control applying the proper torque to the "normal" precession-action axis through the operation of the second power output transducer as a torque motor.

Similarly, by incorporating a torque-producing spring 57 in the torque motor on the "normal" precession-action axis 59, steady state torque may be supplied by the torsion spring with the torque motor operated as a torque trimming device to maintain the precessional deflection to some constant desired optimum value.

This mechanization, representative more of a "rate gyro" than of a "free gyro" has been designated the "Advanced Concept".

While complete experimental verification of the validity of the expected performance characteristics has not been completed, it is on the laboratory development schedule.

Sufficient exploratory experimentation has been conducted to provide conference that the "Advanced Concept" will work "as advertised."

For example, it has been "manually" demonstrated on an experimental set-up using a free gyro with a six-inch diameter rotor that with the application of manual torque around two orthogonal axes, e.g., "polar" and "equatorial" that, with all the torque that could manually be applied to the two applied torque axes in opposition, the precession around the third axis could be held motionless indefinitely.

It is entirely reasonable that the "manual" polar axis torque could be replaced with earth rotational deceleration torque applied via a power transducer input shaft as in the "normal" (free gyro) mode and the "manual" equatorial axis torque could be replaced with a spring, a torque motor, or a spring and trimming torque motor combination.

Thus, continuous, non-interrupted, non-intermitent power output could be achieved by operating this invention in a "rate gyro mode" instead of a "free gyro mode."

| TABLE OF MATHEMATICAL SYMBOLS | | |
|---|---|---|
| Symbol | Parameter | Units |
| d | Distance | ft |
| E | Energy | ft-lb, KWH |
| F | Force | lb |
| H | Angular Momentum | sl-ft$^2$/s |
| I | Moment of Inertia | sl-ft$^2$ |
| K | Constant of Proportionality | ratio |
| M | Momentum | sl-ft$^2$/s |
| m | Mass | sl |
| P | Power | ft-lb/s, KW |
| r | Radius | ft |
| T | Torque | lb-ft |
| t | Time | sec |
| v | Velocity | ft/s |
| $\Delta$ | Increment of Variable | Dimensionless |
| $\theta$ | Angular Displacement | rad |
| $\Omega$ | Angular Rate (Major factor) | rad/s |
| $\omega$ | Angular Rate (Minor factor) | rad/s |
| . | Differentiation w/r to time | $\frac{d}{dt}$ |

Subscripts
A($_A$) Actual
E($_E$) Earth
e($_e$) Electrical
i($_i$) Input
m($_m$) Mechanical
o($_o$) Output
p($_p$) Precession
r($_r$) Rotor
t($_t$) Theoretical
T($_T$) Torque

We claim:
1. A planetary inertial power source comprising:
 (a) a gyroscope comprising:
  (i) a rotor with a rotor axis;
  (ii) inner gimbal member having an inner gimbal axis and journalling said rotor to rotate about said rotor axis;

(iii) an angularly space-stable outer gimbal member journalling said inner gimbal member to rotate about said inner gimbal axis, said outer gimbal member having an outer gimbal axis orthogonal to said inner gimbal axis;

(b) a frame member orientationally fixed to the earth such that the outer gimbal axis is substantially parallel to the earth's polar axis and journaling said outer gimbal to rotate about said outer gimbal axis;

(c) a power transducer coupled between two of said members such that relative motion between the spatially rotating earth and the space-stable outer gimbal generates a gyroscopic precessionally-derived reaction torque that drives said power transducer to produce output power; and, (d) re-precessing means for providing reorientational torques about an axis in an equatorial plane and about the polar axis.

2. Structure according to claim 1 wherein said power transducer is coupled between said outer gimbal member and said frame member.

3. Structure according to claim 1 wherein said power transducer is coupled between said inner and outer gimbal members.

4. Structure according to claim 1 and including two power transducers, one of which is coupled between said outer gimbal member and said frame member, and the other of which is coupled between said gimbal members.

5. Structure according to claim 1 and including an anchor means anchoring said frame to the earth whereby the angular displacement of the earth as it rotates causes said rotor to precess due to power output generating torque produced by said transducer, and causes said transducer to output power.

6. Structure according to claim 5 wherein said anchor means fixes said frame member with the outer gimbal axis established in an orientation substantially parallel to the rotational axis of the earth such that the parallel planes of the infinite set of parallel equatorial planes defined by planes normal to said outer gimbal axis are substantially parallel to the plane defined by the earth's equator.

7. Structure according to claim 6 wherein said power transducer is effective to output power during a rotor spin axis precessional power output stroke as said rotor precesses through an output power producing arc approaching 180 degrees from a power output stroke starting orientation to a power output stroke ending orientation, and said re-precession means is adapted to re-precess said rotor axis from said power output stroke ending orientation substantially into said power output stroke starting orientation.

8. Structure according to claim 7 wherein said re-processing means comprises a re-processing torque motor mounted in said gyroscope to torque said rotor axis about an axis in said equatorial plane.

9. Structure according to claim 8 wherein said re-precession torque motor is coupled between said gimbal members.

10. Structure according to claim 9 wherein said rotor must be re-processed through a re-precession arc of over 180 degrees and said re-precession torque motor is reversible such that said inner gimbal member can be torqued in both forward and reverse directions substantially corresponding to the first and second half of said re-precession arc.

11. Structure according to claim 10 wherein said power transducer comprises a power output generator operable as a torque motor by inputting power to the output of said generator in order to torque said outer gimbal member relative to said frame member around the polar axis such that the rotor continues the re-precessional motion during the time that there is essentially no polar component of the rotor spin vector upon which equatorial re-precession torque may act, thus making use of the large equatorial plane component of the rotor spin vector in order to transition the rotor polar axis spin vector component from one polarity of polar rotor spin vector component alignment to the opposite polarity of the polar axis spin vector alignment.

12. Structure according to claim 11 and including an angular position sensor mounted between said gimbal members for sensing the angular position of said rotor axis relative to the outer gimbal member and including a control system for controlling said transducer and torque motor as said rotor cycles repeatedly through said power output arc and re-precession arc.

13. Structure according to claim 12 wherein said angular position sensor comprises a segmented ring mounted on one of said gimbal members around the axis of the other of said gimbal members, and having a contactor brush mounted on the other of said gimbal members wiping said segmented ring, with said control system being wired to said motor, power transducer, brush and segmented ring so as to provide signals to the control system for the proper timed initiation and termination of the power-output, precessional, reprecessional and torque phases of the operational cycle.

14. An inertial power source comprising:
(a) a gyroscope having a rotor, a gimballing mechanism rotationally mounting said rotor and a frame member mounting said gimballing mechanism including an outer inherently angularly space-stable gimbal;
(b) said frame being rigidly fixed to the earth against relative angular displacement;
(c) mechanical power transducer means coupled between said gimballing mechanism and said frame member to output power and energy;
(d) re-precessing means for providing a reorientational torque about an axis in the equatorial plane, and means for applying torque about the polar axis to transition the re-precessional axis across the equatorial plane to avoid gimbal lock.

15. Structure according to claim 14 wherein said gimballing mechanism comprises an inner gimbal member and an outer gimbal member mounted in said frame member and said mechanical power transducer means is coupled between two of said members.

16. Structure according to claim 15 wherein said mechanical power transducer is coupled between said frame member and said outer gimbal member.

17. Structure according to claim 16 wherein said frame is fixed to the earth such that the rotational axis of said outer gimbal is parallel to the rotational axis of the earth and the earth's rotation action generating torque is produced by the reaction of a torque-generating device acting on the precessional axis.

18. Structure according to claim 17 wherein said torque-generating device comprises a torsion spring.

19. Structure according to claim 17 wherein said torque-generating device comprises a torque motor.

20. Structure according to claim 17 and including a static torque generator providing polar axis continuous precession output torque around the polar axis producing a transient precession motion and a stable precession displacement resulting in continuous uninterrupted power output without requiring re-precession.

21. A method of extracting energy from a gyroscope system using the rotation of the earth comprising:
   (a) with a gyroscope having at least one inherently angularly spatially stable gimbal member and being journalled in a frame member, fixing said frame member non-angularly-displaceably to the earth such that as the earth rotates precession torques on the gyroscope rotor spin axis cause said at least one gimbal member to precess in said frame member; and
   (b) with a mechanical energy transducer coupled between two of said members, transducing power and energy from the relative motion and precession-inducing torque therebetween and outputting same as a net positive energy output from the system.

22. A method according to claim 21 wherein said gyroscope includes an inner and outer gimbal member, and said transducer is a gimbal-frame transducer coupled between said outer gimbal member and said frame member, and step (b) comprises transducing power and energy from said gimbal-frame transducer.

23. A method according to claim 22 wherein said gyroscope has a rotor, and as the earth rotates said rotor sweeps from a starting orientation through a power output stroke to an ending orientation, and including a re-precession step comprising applying torque about a re-precessing torque axis, of re-precessing said rotor substantially back into said starting orientation ready another power stroke.

24. A method according to claim 23 wherein said power stroke approaches a 180-degree precessional sweep of said rotor axis in angular excursion, and said re-precession step comprises rotating the rotor spin vector on the order of just over 180 degrees.

25. A method according to claim 24 wherein said re-precession step includes, when said rotor is in its power output stroke ending orientation, torquing same about an axis substantially orthogonal to said rotor axis.

26. A method according to claim 23 wherein said re-precession step comprises the following sub-steps:
   (a-1) when the rotor spin vector is in the power output stroke ending orientation, torquing same about an initial re-precession torque axis normal to the polar component of the rotor axis through a first re-precession arc of on the order of 90 degrees to the point at which the rotor axis is nearly aligned with the torque axis in a plane substantially parallel to the earth's equatorial plane, thereby creating an initial re-precession gimbal lock condition;
   (a-2) on the completion of step (a-2), providing a torque substantially orthogonal to the equatorial plane through a second re-precession arc until the rotor spin axis substantially exists said initial re-precession gimbal lock condition; and,
   (a-3) torquing said rotor axis about the torque axis of step (a-1) but with the re-precessional torque applied in the reverse direction through a third re-precessional arc to on the order of just over 180° from the rotor power output stroke ending orientation by reversing the torque of step (a-1).

27. A method according to claim 26 wherein all steps are repeated in sequence, cycling indefinitely to produce at least intermittently continuous power.

* * * * *

UNITED STATES PATENT AND TRADEMARK OFFICE
CERTIFICATE OF CORRECTION

PATENT NO. : 5,313,850                                                  Page 1 of 2

DATED : May 24, 1994

INVENTOR(S) : Finvold et al

It is certified that error appears in the above-indentified patent and that said Letters Patent is hereby corrected as shown below:

Column 3, line 61, "an" should read --and--.
Column 4, line 48, "Conversation" should read --Conservation-- (two occurrences).
Column 5, line 10, "of" should read --or--.
Column 5, line 33, "Greek letter feta requires dot on top".
Column 5, line 67, "prior" should read --polar--.
Column 10, line 67, delete "60".
Column 11, line 33, "form" should read --from--.
Column 12, line 19, "Feta should appear as a full letter and not a subscript, and it should be dotted".
Column 14, line 40, "or" should be deleted.
Column 17, line 48, "an" should read --any--.
Column 20, line 7, "correct spelling of consequent.
Column 21, lines 60-61, after "bearing" and before "to alignment" should read --86 to be correctly positioned within slot 88, such that it will hold the orthogonality positioning of the inner gimbal axis 68--.
Column 24, line 33, "form" should read --from--.
Column 25, line 1, "Dot the feta".
Column 25, line 3, "Elevate and capitalize the letter "A".
Column 25, line 17, "a basis for" to read --the basis for--.

UNITED STATES PATENT AND TRADEMARK OFFICE
CERTIFICATE OF CORRECTION

PATENT NO. : 5,313,850

DATED : May 24, 1994

INVENTOR(S) : Finvold et al

It is certified that error appears in the above-indentified patent and that said Letters Patent is hereby corrected as shown below:

Column 27, claim 10, line 63, "correct the spelling of re-precessed".
Column 30, claim 26, line 26, "exists" should read --exits--.

Signed and Sealed this

Seventeenth Day of October, 1995

Attest:

BRUCE LEHMAN

Attesting Officer

Commissioner of Patents and Trademarks